United States Patent [19]

Bard et al.

[11] Patent Number: 4,833,300
[45] Date of Patent: May 23, 1989

[54] SPACE HEATING ELEMENT HAVING A CERAMIC BODY WITH AN ELECTRICALLY RESISTIVE COATING THEREON

[75] Inventors: Martin Bard, Amberg; Gottfried Cremer, Cologne, both of Fed. Rep. of Germany

[73] Assignee: Buchtal Gesellschaft mit beschrankter Haftung, Fed. Rep. of Germany

[21] Appl. No.: 131,856

[22] Filed: Dec. 11, 1987

Related U.S. Application Data

[63] Continuation-in-part of Ser. No. 707,466, Mar. 1, 1985, abandoned.

[51] Int. Cl.[4] ............................................. H05B 3/26
[52] U.S. Cl. .................................. 219/345; 219/213; 219/543
[58] Field of Search ............... 219/213, 345, 378, 543; 338/308, 309

[56] References Cited

U.S. PATENT DOCUMENTS

| | | | |
|---|---|---|---|
| 2,777,930 | 1/1957 | Nathanson | 219/543 |
| 2,961,522 | 11/1960 | Hammer | 219/543 |
| 3,179,544 | 4/1965 | Smith-Johannsen | 219/543 |
| 3,539,770 | 11/1970 | Wallace | 219/345 |
| 3,627,981 | 12/1971 | Kuhn | 219/212 |
| 3,649,622 | 9/1972 | Bentley | 219/213 |
| 3,766,644 | 10/1973 | Davis | 29/611 |
| 3,947,658 | 3/1976 | Sato et al. | 219/504 |
| 3,982,092 | 9/1976 | Marriott | 219/543 |
| 4,060,663 | 11/1977 | Merz et al. | 428/428 |
| 4,120,712 | 10/1978 | Sindt | 156/71 |
| 4,368,380 | 1/1983 | Igashira et al. | 219/539 |
| 4,591,701 | 5/1986 | Tokumaru | 219/543 |

FOREIGN PATENT DOCUMENTS

| | | |
|---|---|---|
| 1440971 | 1/1969 | Fed. Rep. of Germany . |
| 1924202 | 11/1970 | Fed. Rep. of Germany . |
| 3325204 | 1/1986 | Fed. Rep. of Germany . |
| 2490056 | 3/1982 | France . |
| 52-41936 | 3/1977 | Japan . |
| 2091528 | 7/1982 | United Kingdom ............... 219/543 |

OTHER PUBLICATIONS

Canespa KG pamphlet "Canespa-Therm", undated.

Primary Examiner—Teresa J. Walberg
Attorney, Agent, or Firm—James R. Ignatowski; Remy J. VanOphem

[57] ABSTRACT

An electrical space heating element having a ceramic body which is provided on the side facing away from the space to be heated with an electrically resistive coating. The space heating element provides a high thermal yield while consuming little electrical power and may be used as an element of design for the periphery of a room. The space heating element may be installed in such a way so that no channels are formed which might force air currents to circulate in the room to be heated. The electrically resistive coating is a layer of a carrier impregnated with nonmetallic particles which have a large specific area, are electrically conductive, and do not substantially vary the electrical conductivity at higher temperatures. The carrier in which the nonmetallic particles are embedded has no greater than poor electrical conductivity. The electrically resistive coating is applied in such a way that it has uniform electrical and thermal conductivity.

21 Claims, 3 Drawing Sheets

SPACE HEATING ELEMENT HAVING A CERAMIC BODY WITH AN ELECTRICALLY RESISTIVE COATING THEREON

CROSS REFERENCE TO RELATED APPLICATION

This application is a continuation-in-part of U.S. Patent Application Ser. No. 707,466 entitled "A Space Heating Element Comprising a Ceramic Shaped Body Provided with an Electrically Resistive Coating and a Method for Producing Same" filed on Mar. 1, 1985 now abanboned.

BACKGROUND OF THE INVENTION

1. Field of the Invention

The present invention relates to an electrical space heating element and in particular to a space heating element having an electrically resistive coating applied to the surface of a ceramic body on the side facing away from the space to be heated.

2. Description of the Prior Art

Space heating elements are generally provided under window openings so that the air of the room which is to be heated by the heating element rises past the window openings, thereby producing a curtain of warm air in front of the window. Also, in the case of radiators located against the walls, there is a movement of air from the floor to the ceiling of the room being heated, so that the heat radiated by the radiator into the room plays only a small part.

Conventional room heating elements of the radiant type have radiation areas which are very limited and must operate at high temperatures to be effective.

The prior art also includes floor heating devices, by which heating coils contained in a liquid heat transfer medium, or electrical heating conductors, are provided in the floor pavment or beneath the uppermost floor covering. However, floor heating is relatively troublesome and expensive to install and requires relatively complicated controls.

Accordingly, there exists a need for space heating elements for the periphery of the room which can perform singularly, in groups, or which cover the entire periphery of the room or a substantial part thereof, to heat the room or a selected part of the room.

Examples of such space heating elements are ceramic bodies, such as floor tiles, which act as the floor, wall tiles for the walls, and ceiling tiles for the ceiling. These tiles can be used to heat various spaces, such as private rooms, stores, offices, sanitary rooms, gymnasiums, and indoor swimming pools. Such ceramic bodies may also be shaped bricks for lining swimming pools and the like.

A pamphlet issued by Canespa KG 3005 Hemmingen-Westerfeld Gutenbergstrasse 13, in 1975, discloses a wireless heating system called "Canespa-therm" in which a heating varnish layer is provided as an electrically resistive coating on the back of a ceramic tile. This heating varnish layer is covered by a polyurethane foam body. However, this system did not find wide acceptance, since there was frequent local overheating resulting in various adverse consequences which even included safety risks to persons and objects.

The prior art also includes an electrical space heating device according to DE-A No. 1440971 which includes a carrier with a large smooth surface and a thin heating conductor extending across the surface and adhering directly thereto. The carrier is an earthware or vitreous fused silica tile. This tile is provided on its side facing away from the visible side with a thin metallic electrically conductive coating extending across the surface which is formed by precipitating a chemical solution or by applying a very thin aluminum layer.

It is necessary in the case of a space heating element of the foregoing type to provide for spacing between the tile and the carrier surface in which it is mounted and this spacing, in turn, forms a path for the air of the room behind the space heating element with all the disadvantages described above which have already been observed in the case of the space heating devices. Furthermore, the metallic resistive layers used have a relatively low resistance value and require high electrical power to obtain a sufficient thermal yield.

German Pat. No. DE-A 1924202 and the nonpublishd application DE-A No. 3325204 disclose a sheetlike electrical heating device which has a sheetlike carrier that includes a heating element, in which the heating element is formed as a thin layer of electrically conductive material which is applied to one surface of the carrier. In the event the electrically conductive material consists wholly or partially of semi-conductor material, as described in DE-A No. 3325204, uniform results cannot be achieved therewith because the electrical resistance of such layers cannot be produced in a reproducible manner. The heating device of this type, therefore, exhibits heating capacities which differ from piece to piece. German Pat. No. DE-A 1924202 discloses an electrically conductive glaze on the visible side of the ceramic body for removing static electricity. This glaze is so highly resistive that it is not suitable for heating purposes.

The ceramic bodies used up to now have maximum dimensions of 30 cm×30 cm because they can only be produced by the dry press method if the tile thickness is to be as small as possible. A large number of such tiles are required if a wall surface is to be covered with such tiles in order to heat a room. Correspondingly, a large number of electrical connections have to be made between the individual tiles. Further, the joints between the individual tiles create unheated gaps in the surface considerably reducing the portion of the covered wall available as radiating surface.

SUMMARY OF THE INVENTION

The present invention is directed to the problem of providing a heating element which supplies a high thermal yield while requiring little electrical power, which is capable of being used as an element of design for the periphery of a room, which may be installed in such a manner so that no channels are formed which might force air currents to circulate in the room to be heated, and which is reproducible. The present invention is further directed to providing a large-size sheetlike heating element which reduces the number of heating elements required to cover a particular wall area and which reduces the number of electrical connections.

These problems are solved according to the invention by a heating element which has a ceramic body, one side of which is visible from within the space to be heated and the other side of which has an electrically resistive coating thereon. The electrically resistive coating includes a carrier which has little or no electrical conductivity and electrically conductive nonmetallic particles embedded in the carrier. Graphite and carbon black are the preferred nonmetallic particles because they are electrically conductive and do not substantially alter their electrical conductivity as a function of temperature.

The sheetlike ceramic body is made by pressing a flowable ceramic starting material, rolling the pressed body to form a sheetlike structure, then baking the sheetlike structure to produce a sheetlike ceramic body. The sheetlike ceramic body thus formed has a surface area at least four times that of the commercially available 30 cm×30 cm tile and thickness to area ratio of at most 1:45,000. The sheetlike ceramic body has a thickness of approximately 0.8 cm and the electrically resistive coating is applied on the side opposite its visible side. The electrically resistive coating includes a carrier which has little or no electrical conductivity and which is embedded with conductive nonmetallic particles having a large specific area. To illustrate the advantages of the use of the heating elements made from the large-size sheetlike ceramic bodies, consider the case of a 120 cm×120 cm surface which is to be lined with space heating tiles. Using conventional small size space heating tiles there is a surface loss of approximately 19.8%, with respect to the overall surface which is not covered by the space heating tiles. This surface loss is reduced to 8.8% when larger-size space heating tiles having a size of at least 60 cm×60 cm are used. The surface losses can be further reduced if the surface dimensions of the space heating tiles are further enlarged.

Space heating elements formed using large-size ceramic tiles having dimensions up to 200 cm×200 cm square which have resistive coatings can be produced according to the present invention. These space heating tiles allow for the design of any desired decoration by dividing them up and combining them with space heating tiles of smaller dimensions. In the use of such large-size space heating elements, overheating, in particular local overheating, has not been encouraged.

Thus, space heating elements may be provided in various shapes and sizes which, when combined as desired, may cover an entire wall, ceiling or floor. The space heating elements act througout the entire room without any forced circulation of the air. Since there is no chilling movement of the air, the occupant in the room will feel comfortable at substantially lower room temperatures which leads to considerable energy savings.

In the case of local variations in the electrically resistive coating, there is no material affect on capacity. At most, there is a slight local reduction in heating capacity, but no complete interruption thereof, and there is no local overheating.

The resistive coating may consist of a layer of a non-aging synthetic resin with electrically conductive nonmetallic particles embedded therein. For example, a mixture of pure graphite and a non-aging synthetic may be made which exhibits a resistance value which will result in a resistive layer having the desired electrical characteristics. The resistance value of the layers of the resin and embedded conductive nonmetallic particles may be varied from a value of a few ohms up to a value of several thousand ohms. The variations are achieved by controlling the proportion of conductive nonmetallic particles embedded in the resin and/or controlling the layer thickness. The layer thickness is preferably between 10 microns and 50 microns.

The electrical power consumption in the resistive layer is preferably about 0.01 watts/cm$^2$. Therefore, in the case of a 100 cm×100 cm space heating element, the electrical power consumption is approximately 100 watts. In the case of a 60 cm×60 cm tile, the power consumption would be between 30 watts and 40 watts.

The term "non-aging" as used herein refers to stability of the synthetic resin under continuous thermal stresses up to approximately 100° C. throughout the lifetime of the heating element.

In an alternate embodiment of the invention, the electrically resistive coating consists of an electrically resistive film having a polyester cover layer, an electrically resistive intermediate layer, electrical contacts, and a polyester bottom layer. Such resistive films are known in the art. The electrical contacts leading to the resistive layers are preferably copper bands. The major problem with using resistive films is that the polyester layers adhere poorly to the resistive layers. As a result, the only areas of adhesion are about the periphery of the space heating element and it is not certain that the ceramic tile will adhere to the place of attachment. In spite of this problem, polyester is recommended as the material for the cover and bottom layers because polyester is very non-aging. The problem discussed above can be solved by dividing the resistive intermediate layer into a plurality of spatially separated resistive areas and providing perforations through the cover and bottom layers in the areas separating the resistive intermediate layers. This permits the use of an adhesive which sticks only to the plaster surfaces and the ceramic surfaces but not, or not well, to a polyester surface to bond the tile plates to the attachment surface.

When a ceramic tile having a resistive film is attached to a plastered wall or the like, adhesion takes place by the adhesive which passes through the perforations so that the area of the ceramic body which is attached to the intended surface is increased. It is acknowledged that the attachment through the perforations is only local but is sufficient if the perforation size and pattern are correctly dimensioned.

An electrically resistive coating in the form of a resistive glaze may also be used as a resistive layer. This glaze is applied to the ceramic tile after it is baked and fixed by a second baking. The resistive glaze whose melting point is not higher than 750° C. is applied to the side opposite the side facing the space to be heated to form the resistive layer. Resistive glazes with higher melting points are unsuitable.

In a fourth embodiment of the space heating element, the adhesive for bonding the ceramic tile to a surface may be an electrically resistive surface. This requires the use of two different types of adhesive, the adhesive adjacent to the ceramic body being electrically resistive and the adhesive lying against the surface to which the tile is to be attached being an electrically insulative adhesive. The two adhesives have substantially the same thermal expansion properties and are chemically compatible with one another.

Electrical contacting of the electrically resistive coatings to each other and to a source of electrical power may be accomplished by contact elements arrange symmetrically on the electrially resistive layer. The electrical contacting elements, in the form of contacting bands, may be arranged on square or rectangular tiles along any two edges facing away from each other. If the ceramic tile has a relief structure on its back side, the contacting elements are arranged in channels located at the edges facing away from each other.

According to the present invention, it is possible to adjust the resistance value of the electrically resistive layers on such ceramic tiles. This is accomplished by reducing the thickness of the resistive layer or heating the resistive layer to increase its resistance value. The thickness of the resistive layer can be mechanically reduced by sandblasting, electroerosion, brushing or the like, or the resistive layer may be heated from the outside to increase its resistance. It is possible to pass electric current of considerably greater power than used during normal operation through the resistive layer to increase its resistance value.

BRIEF DESCRIPTION OF THE DRAWINGS

FIG. 6 is a cross-sectional side view of the heating element of FIG. 1 illustrating a mechanical technique for changing the resistance of the resistive layer.

DETAILED DESCRIPTION OF THE PREFERRED EMBODIMENT

Figure 1:
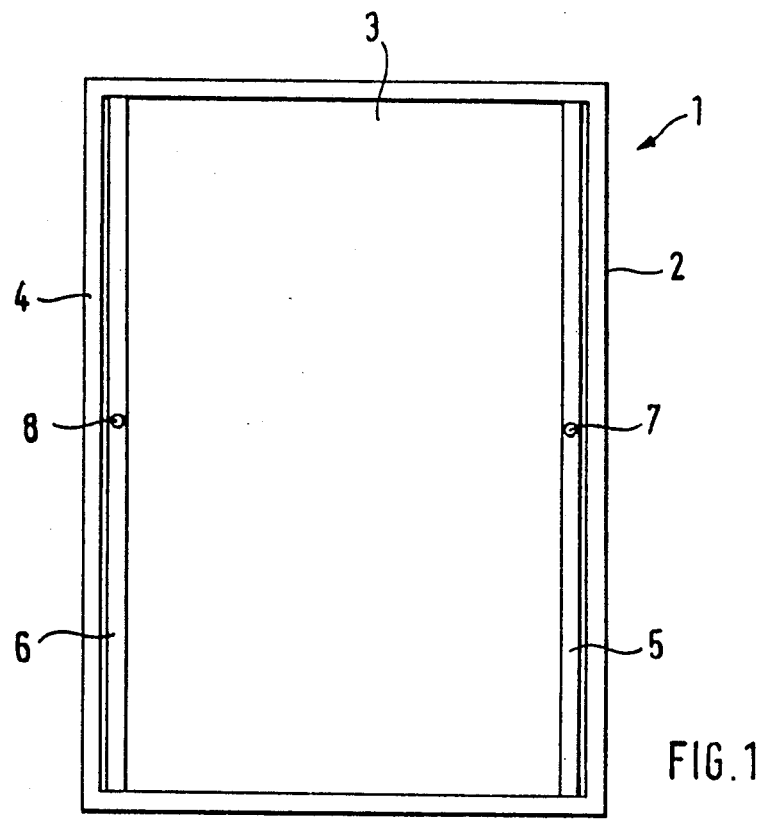
FIG. 1 is a rear view of a preferred embodiment of the space heating element.

As is shown in FIG. 1, a space heating element 1 according to the present invention is in the form of a ceramic tile. The space heating element has a ceramic tile body 2 whose dimensions, illustratively, are 85 cm × 125 cm having a thickness of 0.8 cm and an electrically reisistive layer 3 on a back surface 4 of the ceramic tile body 2. The back surface 4 of the ceramic tile body 2 is the surface facing away from the space to be heataed. The ceramic tile body 2 may be a conventional 30 cm × 30 cm (12 inch × 12 inch) square tile or a large-size sheetlike ceramic tile up to 200 × 200 cm square. Preferably the large-size ceramic tile bodies, which have surface areas greater than 3,600 cm², should have a thickness to area ratio of at most 1:45,000. For structural reasons, the thickness of the tile body should be between 0.8 and 1.0 cm, with 0.8 cm thickness beting the preferred thickness. This thickness is an optimal compromise between structural integrity and heat transfer capabilities. Contacting elements 5 and 6 are applied to the electrically resistive layer. Contacts 7 and 8 are provided on the contacting elements 5 and 6, respectively, to permit the connection of the electrically resistive layer 3 to a source of electrical power (not shown).

Figures 2, 3:
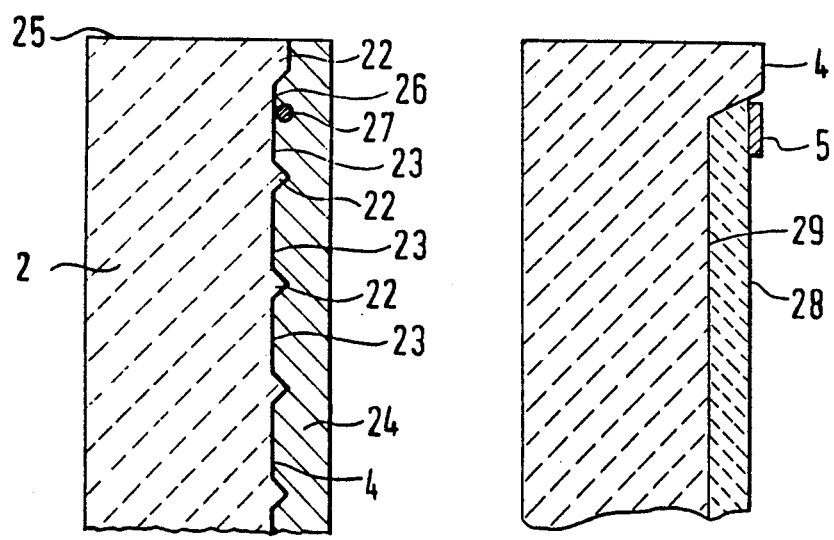
FIG. 2 is a cross-sectional top view of an alternate embodiment of a space heating element in which the ceramic tile has a relief structure on its back.
FIG. 3 is a cross-sectional top view of the embodiment shown in FIG. 1 having an electrically resistive glaze applied to the rear surface of the ceramic tile.

A space heating element in which the ceramic tile body 2 has a relief pattern on its back surface 4 is shown in FIG. 2. This back surface 4 is provided with ridges 22 and a groove 23 overlaid with a resistive adhesive layer 24. A conductor 27 is provided in a groove 26 adjacent to an edge 25 of the ceramic tile body. The resistive adhesive layer 24 is a resistive material which converts electrical energy into thermal energy.

A space heating element in which the electrically resistive layer is an electrically resistive glaze 28 formed on the back surface 4 of a ceramic tile body 2 is shown in FIG. 3. The ceramic tile body 2 has a relief 29 provided in its back surface 4. The resistive glaze 28 is applied in the relief 29 after the ceramic tile body 2 is baked and fixed by baking once again. The melting temperature of the resistive glaze is preferably less than 750° C. to avoid the 750° C. quartz transition point of the baked ceramic tile body 2. Because of this, a ceramic tile body should never be heated above the quartz transition point, otherwise the tile could be damaged and could crack. For this reason, glazes whose melting temperatures are greater than 750° C. are unsatisfactory for this application. The resistive glaze is embedded with conductive nonmetallic particles, such as graphite or carbon black. Through the use of these types of materials the electrical and thermal conductivity of the glaze is substantially uniform. This prevents thermal runaway and increases the safety of the heating element. An electrical contact element 5 is applied along the edge of the resistive glaze 28 as shown in FIG. 3.

Figure 4:
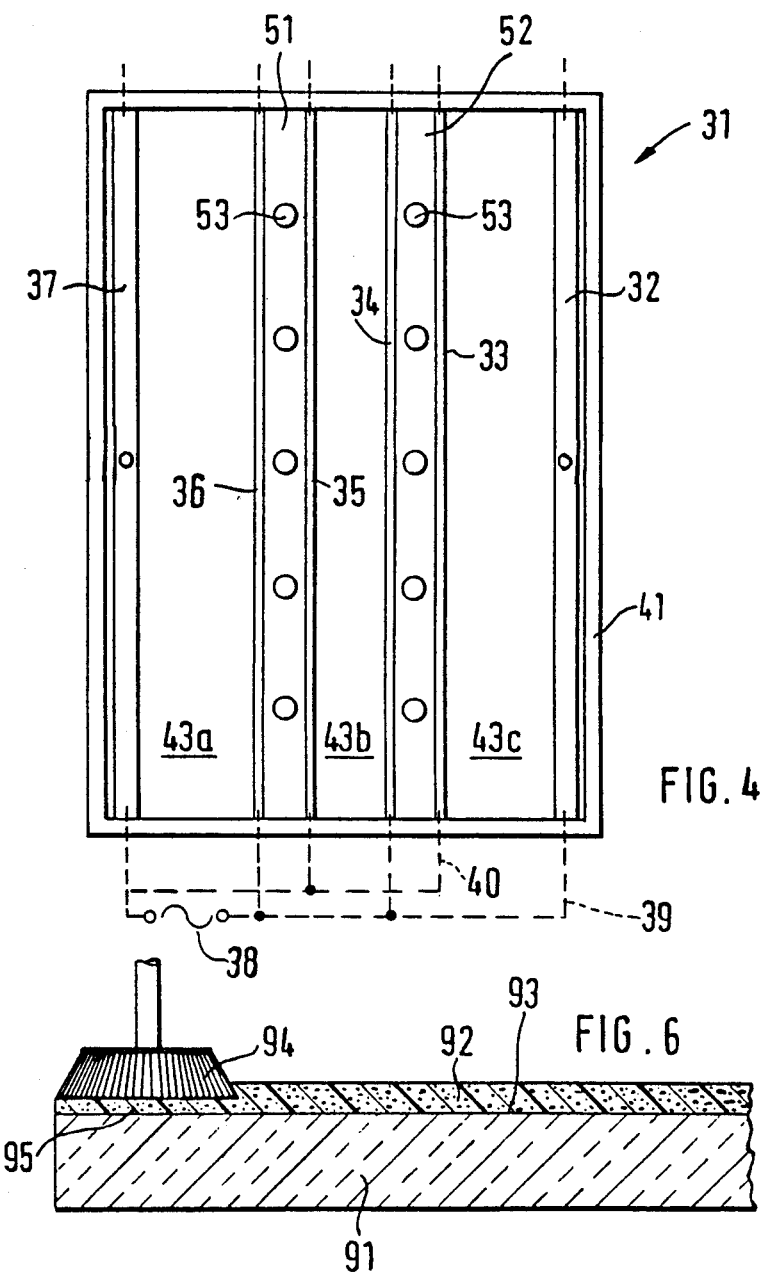
FIG. 4 is a back view of another embodiment of the space heating element having an electrically resistive film applied to its rear surface.
Figure 5:
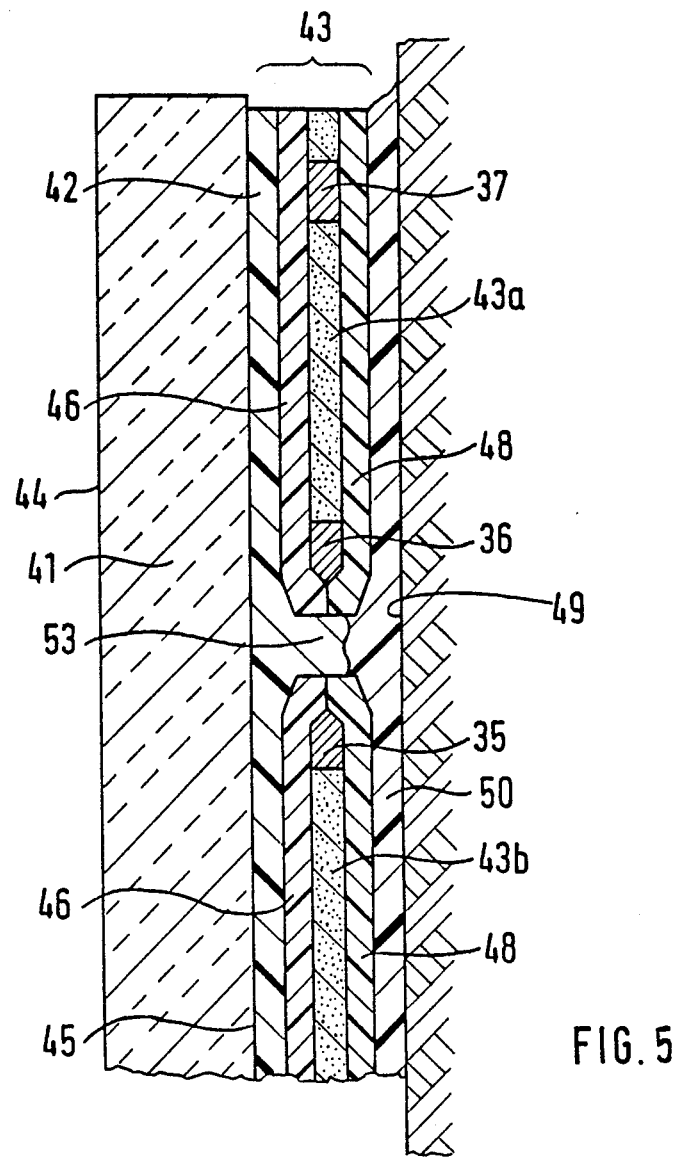
FIG. 5 is a partial cross-sectional side view of the embodiment of the space heating element shown in FIG. 4 at an enlarged scale.

In the embodiment shown in FIGS. 4 and 5, there is provided a space heating element, identified generally by reference numeral 31, which has a ceramic tile body 41, an adhesive layer 42, and a resistive film 43. The resistive film 43 includes a polyester cover layer 46 connected by the adhesive layer 42 to the side 45 which faces away from the visible side 44 of the ceramic tile body 41, a plurality of resistive layers 43, such as graphite and/or carbon black layers 43a, 43b, and 43c and a polyester bottom layer 48. Each of the resistive layers 43 are provided at their edges with electrical supply and removal lines in the form of copper bands 32 through 37, as shown in FIG. 4. The copper bands 32 through 37 are connected to a source of electrical power 38 by means of electrical leads 39 and 40 as shown. The individual copper bands may be interconnected as shown in FIG. 4 or in any other manner one chooses. The polyester bottom layer 48 is bonded to a supporting surface 49, such as a plastered wall, by an adhesive layer 50. A greater or lesser number of resistive layers 43a through 43c may be used, depending upon the size and/or shape of the ceramic tile body.

Between the intermediate resistive layers 43a and 43b and 43b and 43c there are spacer areas 51 and 52, as shown in FIG. 4, which separate the resistive layers as shown and in which no resistive layer material 43 is present. In the separation spaces 51 and 52 which are covered only by the cover layer 46 and the bottom layer 48 there are a plurality of perforations 53 through which the adhesive of the adhesive layer 42 passes through and communicates with the adhesive from the adhesive layer 50 on the supporting surface 49. The space heating element 31 may also be replaced by three subtiles, each having one of the intermediate resistive layers 43a through 43c, or may be formed on a much larger ceramic body and include more than three intermediate resistive layers 43a through 43c.

It is also contemplated that it is possible to provide a space heating element with a resistive layer in the form in which its area is continuous but still leaving areas not covered thereby, for example, by a meandering shaped arrangement of the resistive layer or a division thereof into several sublayers in the form of bands, surface elements, or the like, which extend across the surface, which are initially electrically connected to each other or which are subsequently connected to each other. The selection of the appropriate pattern depends upon local considerations and/or technical requirements.

As shown in FIG. 6, a resistive layer 92 is provided on the back side 93 of a ceramic tile 91. The thickness of the resistive layer 92, as initially applied, is thicker than necessary. The resistive layer may then be reduced to the desired thickness by sandblasting, electroerosion, brushing, or any other mechanical means known in the art. In the embodiment shown, by way of an example, this is accomplished by a rotating brush 94 which reduces the thickness of the layer to the desired thickness as indicated by the area 95. The reduction of the thickness of the resistive layer 92 reduces the conductivity of this layer and increases its resistance. In this manner selective adjustment of the resistance value of the resistive layer 92 is possible.

Having described the present invention by way of an exemplary embodiment, it will be apparent to those skilled in the art that the illustrated embodiments may be modified without departing from the spirit of the present invention or the scope of the claims appended thereto.

What is claimed is:

1. An electrical space heating element comprising:
   a ceramic tile body having a visible side and an opposite side which faces away from said visible side;
   a polyester cover layer;
   an adhesive bonding said polyester cover layer to said opposite side of said ceramic tile body;
   a nonmetallic electrically resistive layer disposed along the surface of said cover layer which faces away from said visible side of said ceramic tile body, said nonmetallic electrically resistive layer being divided into at least two spatially separated areas, each of said spatially separated areas being separated from each adjacent spatially separated area by a separation space;
   low resistance contacting means electrically contacting each of said at least to spatially separated areas in at least two different spatially separated locations; and
   a polyester bottom layer disposed over said cover layer and enclosing said electrically resistive layer therebetween, said bottom and said cover layers having a plurality of perforations provided therethrough along each of said separation spaces.

2. The space heating element of claim 1 wherein said ceramic tile body has a surface area of at least 3,600 square centimeters and a thickness to surface area ratio no greater than 1:45,000.

3. The space heating element of claim 2 wherein said thickness to surface area ratio is 1:45,000.

4. The space heating element of claim 2 wherein the thickness of said ceramic tile body is approximately equal to 0.8 cm.

5. The space heating element of claim 2 wherein the thickness of said ceramic tile body is 0.8 cm.

6. The space heating element of claim 1 wherein the resistance of said electrically resistive layer is substantially constant as a function of temperature.

7. The space heating element of claim 6 wherein the material of said electrically resistive layer is selected from the group consisting of graphite and carbon black.

8. An electrical space heating element comprising:
   a ceramic tile body having a visible side which faces a space to be heated and an opposite side which faces away from the space to be heated;
   an electrically resistive glaze applied to said opposite side, said electrically resistive glaze being embedded with nonmetallic electrically conductive particles such that the electrical resistance of said electrically resistive glaze is substantially constant as a function of its temperature; and
   low resistance contacting means for electrically contacting said electrically resistive glaze in at least two spatially separated areas.

9. The space heating element of claim 8 wherein said electrically resistive glaze is applied to the ceramic tile body in th form of at least one rectangle and wherein said low resistance contacting means is a pair of copper bands disposed along two opposing edges of said at least one rectangle.

10. The space heating element of claim 8 wherein said ceramic tile body has a surface area of at least 3,600 square centimeters and the thickness of surface area ratio is no greater than 1:45,000.

11. The space heating element of claim 10 wherein said thickness to surface area ratio is 1:45,000.

12. The space heating element of claim 10 wherein the thickness of said ceramic tile body is approximately equal to 0.8 cm.

13. The space heating element of claim 10 wherein the thickness of said ceramic tile body is 0.8 cm.

14. The space heating element of claim 8 wherein the material of said nonmetallic electrically conductive particles is selected from the group consisting of graphite and carbon black.

15. The space heating element of claim 8 wherein said electrically resistive glaze has a melting point not greater than 750° C.

16. An electrical space heating element comprising:
    a ceramic tile body having a visible side which faces a space to be heated and an opposite side which faces away from the space to be heated;
    an electrically resistive adhesive applied to said opposite side of said ceramic tile body bonding said ceramic tile body to a mounting surface, said electrically resistive adhesive having nonmetallic electrically conductive particles embedded therein to give it a predetermined resistance value; and
    means for making electrical contact with said electrically resistive adhesive along opposite ends of ceramic tile body.

17. The space heating element of claim 16 wherein said ceramic tile body has a surface area of at least 3,600 square centimeters and a thickness to surface area ratio no greater than 1:45,000.

18. The space heating element of claim 17 wherein said thickness to surface area ratio is 1:45,000.

19. The space heating element of claim 17 wherein the thickness of said ceramic tile body is approximately equal to 0.8 cm.

20. The space heating element of claim 17 wherein said thickness of said ceramic tile body is 0.8 cm.

21. The space heating element of claim 16 wherein the material of said nonmetallic electrically conductive particles is selected from the group consisting of graphite and carbon black.

* * * * *

UNITED STATES PATENT AND TRADEMARK OFFICE
CERTIFICATE OF CORRECTION

PATENT NO. : 4,833,300

DATED : May 23, 1989

INVENTOR(S) : Bard et al

It is certified that error appears in the above-identified patent and that said Letters Patent is hereby corrected as shown below:

Column 1, line 38, delete "pavment" and insert ---- pavement ----.

Column 2, line 16, delete "nonpublishd" and insert ---- nonpublished ----.

Column 2, line 45, after "as" insert ---- a ----.

Column 3, line 37, delete "encouraged" and insert ---- encountered ----.

Column 3, line 41, delete "througout" and insert ---- throughout ----.

Column 4, line 49, delete "requirs" and insert ---- requires ----.

Column 4, line 59, delete "arrange" and insert ---- arranged ----.

UNITED STATES PATENT AND TRADEMARK OFFICE
CERTIFICATE OF CORRECTION

PATENT NO. : 4,833,300

DATED : May 23, 1989

INVENTOR(S) : Bard et al

It is certified that error appears in the above-identified patent and that said Letters Patent is hereby corrected as shown below:

Column 4, line 60, delete "electrially" and insert ---- electrically ----.

Column 5, line 38, delete "reisistive" and insert ---- resistive ----.

Column 5, line 41, delete "heataed" and insert ---- heated ----.

Column 5, line 48, delete "beting" and insert ---- being ----.

Column 7, line 34, delete "to" and insert ---- two ----.

Column 8, line 12, delete "th" and insert ---- the ----.

Column 8, line 18, delete "of" and insert ---- to ----.

Signed and Sealed this

Sixteenth Day of October, 1990

*Attest:*

HARRY F. MANBECK, JR.

*Attesting Officer*  *Commissioner of Patents and Trademarks*